C. P. Fisher.
Harrow.

N° 90,652.  Patented Jan. 1, 1869.

Witnesses:
N. C. Clayton
J. G. Clayton

Inventor:
C. P. Fisher

United States Patent Office.

CYRUS. P. FISHER, OF LEESVILLE, OHIO.

*Letters Patent No. 90,652, dated June 1, 1869.*

IMPROVEMENT IN ROTARY HARROWS.

The Schedule referred to in these Letters Patent and making part of the same.

*To all whom it may concern:*

Be it known that I, CYRUS P. FISHER, of Leesville, in the county of Carroll, and State of Ohio, have invented certain new and useful Improvements in Carriage-Mounted Revolving Harrows; and do hereby declare that the following is a full, clear, and exact description of the same, reference being had to the accompanying drawings, and to the letters of reference marked thereon, which form a part of this specification.

Figure 3 is a vertical section, through the head-block, with the rakes attached, and pinion-shaft.

Figure 4 is a cross-section, through the head, showing the rakes and pins for confining the rakes to the head-block.

The nature of my invention consists in a progressive revolving and flexible harrow, attached to gearing, and attached to a carriage with two wheels.

The harrow is adjustable by means of a lever, by which to raise or lower the same, at the will of the driver, as hereinafter set forth and described.

To enable others skilled in the art to make and use my invention, I will describe its construction and operation.

In the construction of my invention, I make a carriage of two wheels, and axle, to which the wheels are firmly attached, and which shaft revolves with the wheels.

Figure 1:
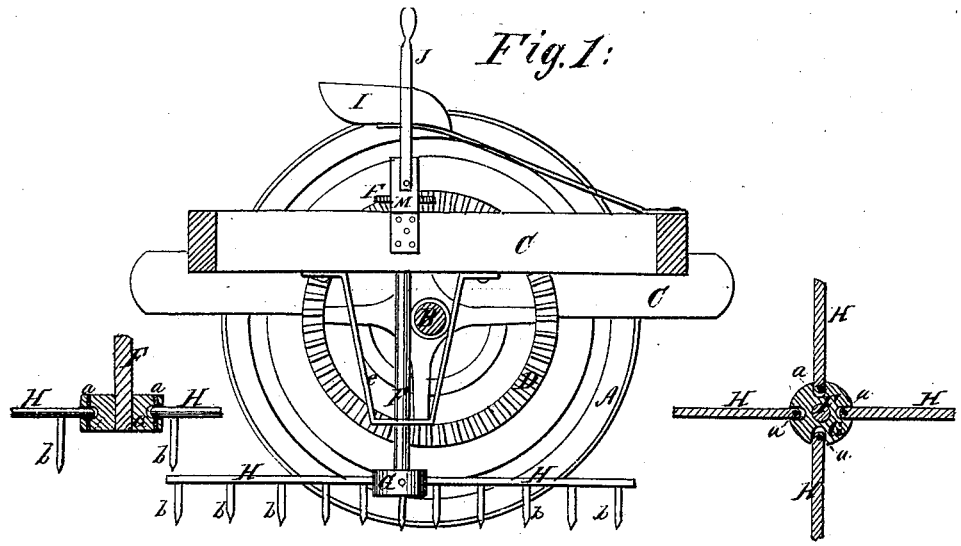
Figure 1 is a sectional side elevation.

In fig. 1—

A A are the wheels.

B, the axle.

Figure 2:
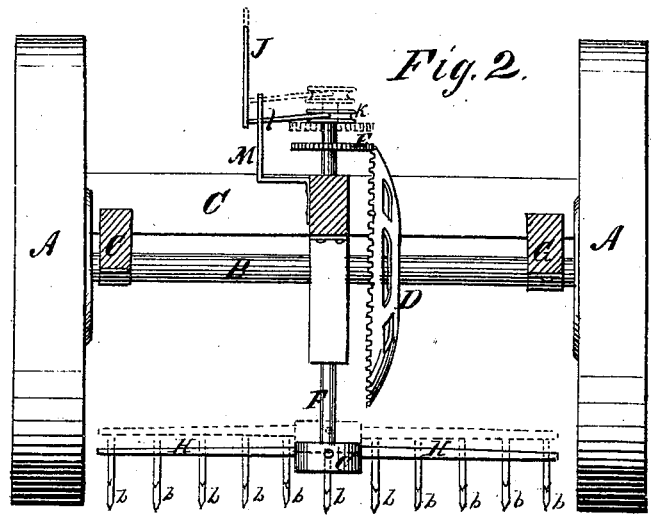
Figure 2 is a sectional end view.

$c\ c$, the frame, which is set on the axle B, and secured by bearings, $d\ d$, as seen in fig. 2.

D, the bevel-gear wheel, attached to the axle B in such position as to allow the pinion vertical shaft to be in the centre of the wheels when the pinion-wheel E is geared into it.

F, pinion-shaft, passing down through the middle bar of frame C and guard or bearing $e$, and which bearing is firmly secured to the frame $c$, through which the pinion F passes.

G is a head-block, which may be cast, or use any other material.

This block is made round and concave on both its sides, so as easily to pass over the earth or any obstructions in the way of the same.

This block has in it two, three, or more holes for the reception of the rake-heads or arms of the harrow H H.

These heads or arms are held in place by means of pins, $a\ a$, as seen in figs. 3 and 4, and the holes or sockets are vertically larger than the arms or heads; so that a vertical motion up or down may be given to them, when required, so as to avoid strain on the pinion-shaft when harrowing over uneven ground.

$b\ b\ b\ b$, the harrow-teeth.

These teeth may be made of any shape best adapted to the purpose intended. I may find a tooth with a sharp edge, razor, or wedge-shape, may be the best for the outer line of the teeth, as this shape will greatly aid in cutting the earth.

I, the seat.

M, the fulcrum of the lever, and is attached to the frame C.

J and L, the lever.

On the end of the lever-arm L is a fork, which fits around the pinion-shaft F, on the top of which is a burr, against which the arm of the lever K operates to throw the pinion-wheel out of gear and raise the harrow above the ground.

The red lines in fig. 2 show the harrow raised and out of gear, when desired to remove the same without operating on the ground.

In the operation of my invention, when a team is attached in the ordinary manner, the driver takes his seat in the seat I, and when he wishes to commence harrowing, the harrow is dropped into the ground, and in gearing, by means of the lever J.

As the team moves forward, the wheels revolve with the axle, the gear-wheel D operates on the pinion-wheel E, on pinion-shaft F, which revolves, carrying the harrow in rapid revolutions, which number of revolutions can be regulated as may be required.

This invention, it will be seen, will never require cross-harrowing, as at all times, in once passing the carriage over the ground, the harrow always operates from two to three or more times, according to the number of revolutions made by the harrow, but it will at any time revolve often enough to harrow the ground at least twice.

I make my harrow simply of arms, without a rim, so that if the teeth should strike against any ordinary-sized object, the force of the harrow in revolving would throw it out at the open spaces between the arms.

In hill-side grounds, it will be seen that my harrow does not leave furrows for the water to run in, as does the drag-harrow.

This I regard as a great improvement in harrows.

It will be seen, that the rapid movement of the harrow will keep it clean, as the force will prevent the teeth from clogging or sticking.

I am aware that revolving harrows have been made to revolve by the resistance of the earth to its progress, but in this class of harrows, the ground is not doubly harrowed, and has to be cross-harrowed in order to cover the grain, but in my invention the ground is always at least doubly harrowed, and the grain fully covered, by the carriage passing once over the ground.

I may find it necessary to gear two harrows to the same carriage, in the same manner as described.

My invention is a great labor-saving machine, as the driver can always ride on the carriage, and have the control of the harrow at command by means of the lever J, and it dispenses with at least half the time in going over the ground, as once doing so completes the preparation of the ground, perfectly covering the grain.

Having thus fully described my invention, in its construction and operation,

What I claim, and desire to secure by Letters Patent, is—

1. The revolving flexible harrow, constructed substantially as described, and operating as and for the purposes set forth.

2. The combination of the revolving flexible harrow with a two-wheel carriage, constructed substantially as described, and operating as and for the purposes set forth.

3. The manner herein described for raising and lowering the harrow, constructed substantially as described, and operating as and for the purposes set forth.

In testimony that I claim the foregoing as my own, I affix my signature, in presence of two witnesses.

O. P. FISHER.

Witnesses:
T. G. CLAYTON,
V. C. CLAYTON.